April 12, 1949.  W. A. WILDHACK  2,466,757

LEAK TESTER

Filed Nov. 30, 1945

Inventor
WILLIAM A. WILDHACK

By M. A. Hayes

Attorney

Patented Apr. 12, 1949

2,466,757

UNITED STATES PATENT OFFICE 2,466,757

LEAK TESTER

William A. Wildhack, Arlington, Va.

Application November 30, 1945, Serial No. 632,091

3 Claims. (Cl. 73—40)

(Granted under the act of March 3, 1883, as amended April 30, 1928; 370 O. G. 757)

This invention relates to means for determining the rate of leakage in closed compartments generally, and is illustrated in the present embodiment by a gas mask leak tester which may be used by aircraft personnel to indicate whether a gas mask for use in high altitude flying is properly fitted and adjusted, preparatory to such flights.

Preparatory to ascending to high altitudes, it is necessary for the crew of an aircraft to properly adjust and fit their oxygen masks for a minimum of leakage in order that the oxygen apparatus may function properly. Without a leak tester, it is often difficult to determine whether the mask is fitted closely enough to reduce the leakage sufficiently for safe operation. It is further necessary to use some leak testing device whereby the rate of leakage may be positively determined. The presently illustrated device is adapted for just this purpose. The invention, however, embraces a broader use: wherever the determination of the rate of leakage into or out of any closed body may be desired.

The object of the invention is to provide a leak tester which is simple and of small size, yet which is adapted to definitely indicate the rate of leakage into or out of a closed compartment under differential pressure.

A further object is to provide a leak tester having an expansible chamber and means for indicating the volume in said chamber.

A further object is to construct a leak tester having an expansible bellows type chamber, a plug at one end for connection to the compartment to be tested, and a weight at the other end for elongating or shortening the chamber, depending on the position in which the tester is held, viz., with the weighted end downwardly or upwardly.

Another object is to provide a bellows type leak tester having a coupling connection at one end and a weight at the other, and provided with guide means at the sides, having scales for indicating the volume of the bellows.

Other and more specific objects will appear in the following description of an illustrative device made in accordance with the present invention, having reference to the accompanying drawings, wherein.

The leak tester consists essentially of an expansible rubber bellows, fastened to solid end plates 2 and 3, one of which is fitted with a bored rubber stopper 4 for connecting to the breathing tube of a gas mask, the other being free to move under the resultant action of pressure in the bellows and its own weight. When held vertically, with the rubber stopper pointing upwardly, the weight of the lower plate 3 causes a suction on the bellows. Any leak in the mask results in the gradual filling of the bellows and lowering of the end plate 3. Timing the rate of filling of the bellows serves to measure the leak.

Graduated guide rods or strips 5 and 8 are provided for guiding the moving plate 3 and indicating the volume. These guides are not needed for making leakage tests under suction except for indicating the volume more exactly, but are useful in making possible leakage tests under pressure, with the tester inverted. The guides are hinged, as at 6, to fold as shown in Fig. 1, so that the tester is fairly compact and can be easily carried in the coat pocket.

Figure 1:
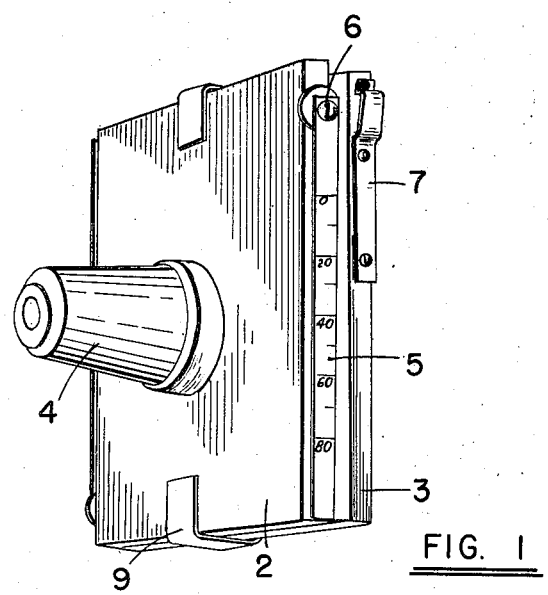
Fig. 1 shows a perspective view of the device in collapsed position.
Figure 2:
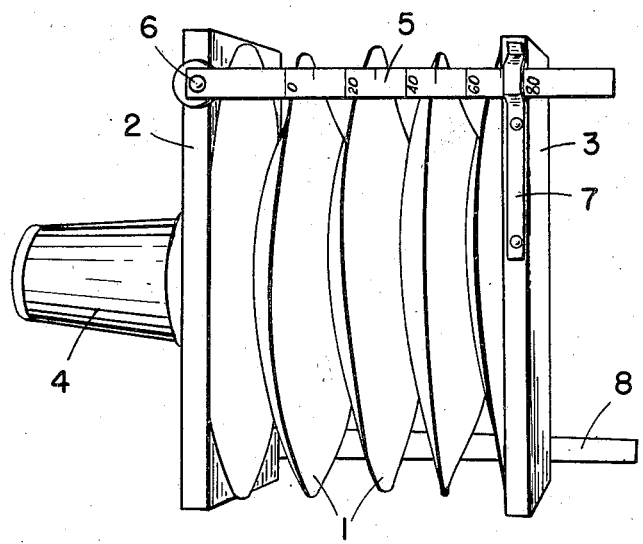
Fig. 2 shows another perspective view of the same device in an extended position with the guides in position for indicating the volume in the extended chamber.

The device, as shown in the collapsed position in Fig. 1, may be provided with a spring clip 9 for holding it in this position, whereby it may be more easily handled when carrying around in the pocket of the personnel. It will be noted that in this position the guide members 5 and 8 are removed from the guide spring clips 7 and turned on their pivots 6 into a position against the edges of the end plate 2, so as to be out of the way when the device is in this collapsed condition.

The weight of the wooden end plate 3 used in the experimental model shown is such as to give a suction of from 1.9 to 1.2 cm. of water as the volume increases from 0 to 80 cc. This is within the range of operating suctions of present oxygen equipment and is considered adequate, but the device can easily be designed for any range of values. A more flexible bellows would give a more nearly constant suction throughout its travel.

If safety-pressure masks are used, it may be desirable to have the plate light enough so that the pressure provided with the tester inverted is just less than the normal loading of the mask valves, say, 0.5 cm. of water. An auxiliary plate with fastener spring clips might then be used in suction testing, to obtain higher suctions.

In the model, the pressure in the inverted position is approximately 2 cm. of water. This is useful only in testing rebreather masks, and is hardly necessary even for this, since the outward leakage will be about the same as the inward, on moderate pressures or suctions.

The guides are not essential in this device (except as a scale) unless a test of mask valve loading is desired; for this, a double end plate appears necessary in order to get sufficient loading.

The extended volume of the bellows is about 100 cc.; each graduation on the scale represents 10 cc. The end plates are approximately 3 inches square.

To make a leak test, the user wearing the mask plugs the stopper into the end of the breathing tube or connector, holds the breath for 10 or 20 seconds while suspending the tester vertically, and notes the change in volume during this interval. The leakage is computed directly in cc. per second or per minute. As a guide to tolerable limits, the AN mask specification requires a leakage of less than 300 cc. per minute (5 cc. per second) for any suction of 0 to 5 cm. of water.

The rubber stopper projecting from the plate is slightly unhandy for carrying, but was used on an early model as most convenient for interchangeable use with Navy breathing tubes, British and Navy quick-acting connectors, and AN quick-acting connectors. For use with the small Navy breathing tubes, or with quick-acting connectors, the leak tester may be made with an appropriate receptor instead of the stopper, and is then somewhat more compact, inasmuch as the receptor may then be made nearly flush with the surface of the plate.

As may be seen, the device illustrated consists of a loaded bellows giving about 2 centimeter of water suction or pressure under the action of gravity in the vertical or inverted positions. The extension of the bellows read on a scale marked off on the guide members indicates the change in volume up to about 80 cubic centimeters. Mask leakage is measured with the tester connected to the breathing tube, by noting the change in volume of the bellows during a 10 or 20 second interval while the person wearing the mask holds his breath. The 10 or 20 second interval may be readily judged by counting off the seconds. After a little practice while watching a second hand on a clock or watch, the count may be fairly accurate in actual practice without the use of a timepiece. Also, the scales may be omitted, since this relative volume change due to leakage may be judged readily. A simple criterion for acceptable leak tightness would be that the bellows should not extend fully, or more than halfway, during a given period, such as 10 or 20 seconds, for instance.

Various refinements and minor changes in form and structure of this device may be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. A leak tester comprising a bellows type collapsible chamber having end plates, one of said plates having means for connecting said chamber to a compartment to be tested, guide means for guiding the movement of the other end plate having means for indicating the elongation of said chamber, said guide means being pivotally adjustable on the edge of one of said end plates whereby they may be turned in alignment with said edge when not in use so that the chamber may be collapsed into a carrying position.

2. A quantitative leak measuring device comprising an axially collapsible bellows, end plates joined to said bellows and defining therewith a chamber, one of said end plates having an opening for connection to a compartment to be leak-tested, and means for indicating the degree of collapse of said chamber.

3. A leak detector for a demand type mask having a hose and a hose coupling, said detector comprising an upper end plate having an opening therethrough, a weighted bottom end plate, a bellows attached to said upper end plate at one end and to said bottom end plate at the opposite end, the opening in said upper end plate opening into said bellows, and means to connect the hose coupling to said opening so that the mask may be connected with the interior of the bellows.

WILLIAM A. WILDHACK.

REFERENCES CITED

The following references are of record in the file of this patent:

UNITED STATES PATENTS

| Number | Name | Date |
|---|---|---|
| 1,283,085 | Cole | Oct. 29, 1918 |
| 1,770,094 | Wickersham | July 8, 1930 |
| 2,383,936 | Hohl | Sept. 4, 1945 |
| 2,420,372 | Heidbrink | May 13, 1947 |

FOREIGN PATENTS

| Number | Country | Date |
|---|---|---|
| 554,406 | France | Mar. 1, 1923 |
| 698,045 | Germany | Oct. 31, 1940 |